United States Patent [19]

Slawsby et al.

[11] Patent Number: 5,308,984
[45] Date of Patent: May 3, 1994

[54] METHOD OF OPERATING A DUAL MODE TRACKING SYSTEM

[75] Inventors: Nathan Slawsby, Canton; Irving Goldstein, Sudbury, both of Mass.; Joseph W. DiBiaso, Nashua, N.H.

[73] Assignee: Raytheon Company, Lexington, Mass.

[21] Appl. No.: 75,710

[22] Filed: Jul. 6, 1987

[51] Int. Cl.$^5$ .......................... H01L 25/00; G01J 5/00; G01S 13/00
[52] U.S. Cl. ..................................... 250/342; 250/332; 250/334; 250/338.1; 342/53; 342/93
[58] Field of Search .................. 342/485, 53, 93, 159; 358/95, 105, 113, 167; 250/332, 334, 338.1, 342; 382/1, 51, 52

[56] References Cited

U.S. PATENT DOCUMENTS

| | | | |
|---|---|---|---|
| 3,781,468 | 12/1973 | Chomet et al. | 358/105 |
| 3,924,130 | 12/1975 | Cohen et al. | 250/342 |
| 4,064,533 | 12/1977 | Lampe et al. | 250/332 X |
| 4,246,480 | 1/1981 | Clark | 250/332 X |
| 4,364,087 | 12/1982 | Storey et al. | 358/105 |
| 4,550,435 | 10/1985 | Hayman | 382/52 X |
| 4,639,774 | 1/1987 | Fried | 358/105 |
| 4,679,086 | 7/1987 | May | 358/167 |
| 4,692,801 | 9/1987 | Ninomiya et al. | 358/105 X |

Primary Examiner—Stephen C. Buczinski
Attorney, Agent, or Firm—Donald F. Mofford; Richard M. Sharkansky

[57] ABSTRACT

A method of processing IR signals from a repetitively scanned array of photovoltaic cells is shown to consist of the steps of: (a) subtracting IR signals received on successive scans to produce response signals corresponding only to IR signals from moving or scintillating objects; (b) generating inhibiting signals for IR signals from the edges of wind-driven clouds or from scintillating objects; and (c) inhibiting those response signals that are from the edges of moving clouds or scintillating objects.

3 Claims, 3 Drawing Sheets

METHOD OF OPERATING A DUAL MODE TRACKING SYSTEM

BACKGROUND OF THE INVENTION

This invention pertains generally to a system for the detection of aircraft or guided missiles, and particularly to a system using radar and infrared (IR) sensors for the detection of low flying aircraft or guided missiles in a high clutter background.

It has been proposed to combine a radar and an IR detection arrangement to provide an improved air defense system. The capabilities of the two different types of detectors then would complement each other, making it difficult, if not impossible, for attacking aircraft or guided missiles successfully to penetrate the space protected by the air defense system. It is necessary, therefore, that an IR detection arrangement be provided so that low flying aircraft or guided missiles (hereinafter sometimes referred to as "targets") not ordinarily detected by radar may be detected, even in the presence of IR clutter. IR clutter may be deemed to be IR signals from one of three different types of sources: (a) ground or the bodies of clouds; (b) scintillating objects; or (c) edges of rapidly moving clouds.

It is known in the art that IR clutter from the ground or bodies of clouds may be distinguished from targets. Thus, IR clutter from the ground or the bodies of clouds may contain frequencies that differ from the frequencies of IR signals from targets. Specifically, the frequency components in IR signals from ground clutter or the body of a cloud are usually concentrated in the lower end of the spectrum, while the frequency components in IR signals from targets are relatively high. Therefore, it is known to filter received IR signals to reject the low frequency components and to pass the high frequency components. Hopefully, then, the IR signals that are passed are deemed to be targets. Unfortunately, however, there are clutter signals that have essentially the same frequency components as a target. Thus, IR clutter from scintillating objects (i.e., objects that reflect sunlight, as, for example, glass surfaces that act as mirrors), have frequency spectra that are quite similar to the frequency spectrum of any target signal, so the known cancellation technique for ground clutter is not effective against scintillating IR clutter. Further, the frequency spectra of the edges of wind-driven clouds are quite similar to the frequency spectra of target signals, so the known cancellation technique for ground clutter is not effective against "wind-driven cloud edge" IR clutter.

It is highly desirable in a dual mode tracking system that there be a high degree of correlation between the targets as seen by a radar and the targets as seen by the IR detection arrangement. That is to say, if the complexity of the data processor in a dual mode tracking system is to be kept within reasonable bounds and if the constant false alarm rate (CFAR) of such a system is to be maintained below a reasonable level, it is necessary that IR clutter signals be eliminated.

SUMMARY OF THE INVENTION

With the foregoing background of the invention in mind, it is a primary object of this invention to provide a signal processing technique for rejecting IR clutter signals resulting from the terrain, scintillating objects and edges of wind-driven clouds.

It is another object of this invention to provide a real time signal processing technique that provides an adjustable Constant False Alarm Rate (CFAR) threshold and a high target detection probability in a severe clutter environment.

The foregoing and other objects of this invention are generally attained by providing a signal processing method for an IR detection arrangement as here contemplated wherein: (a) IR signals received are first subtracted from previously received IR signals to cancel most of the IR clutter signals; (b) the IR signals remaining after step (a) are processed to produce a blanking signal for each one of the IR signals that are similar to an IR signal from scintillating objects; (c) the IR signals remaining after step (a) are also processed to produce a blanking signal for each one of those IR signals that are similar to an IR signal from the edges of wind-driven clouds; and (d), the IR signals that remain after step (a) and that are not coincident with a blanking pulse are processed to produce signals indicative of target detection with a predetermined CFAR.

BRIEF DESCRIPTION OF THE DRAWINGS

Other objects and many of the attendant advantages of this invention will be readily appreciated as the same become better understood by reference to the following detailed description when considered in connection with the accompanying drawings wherein.

DESCRIPTION OF THE PREFERRED EMBODIMENT

Figure 1:
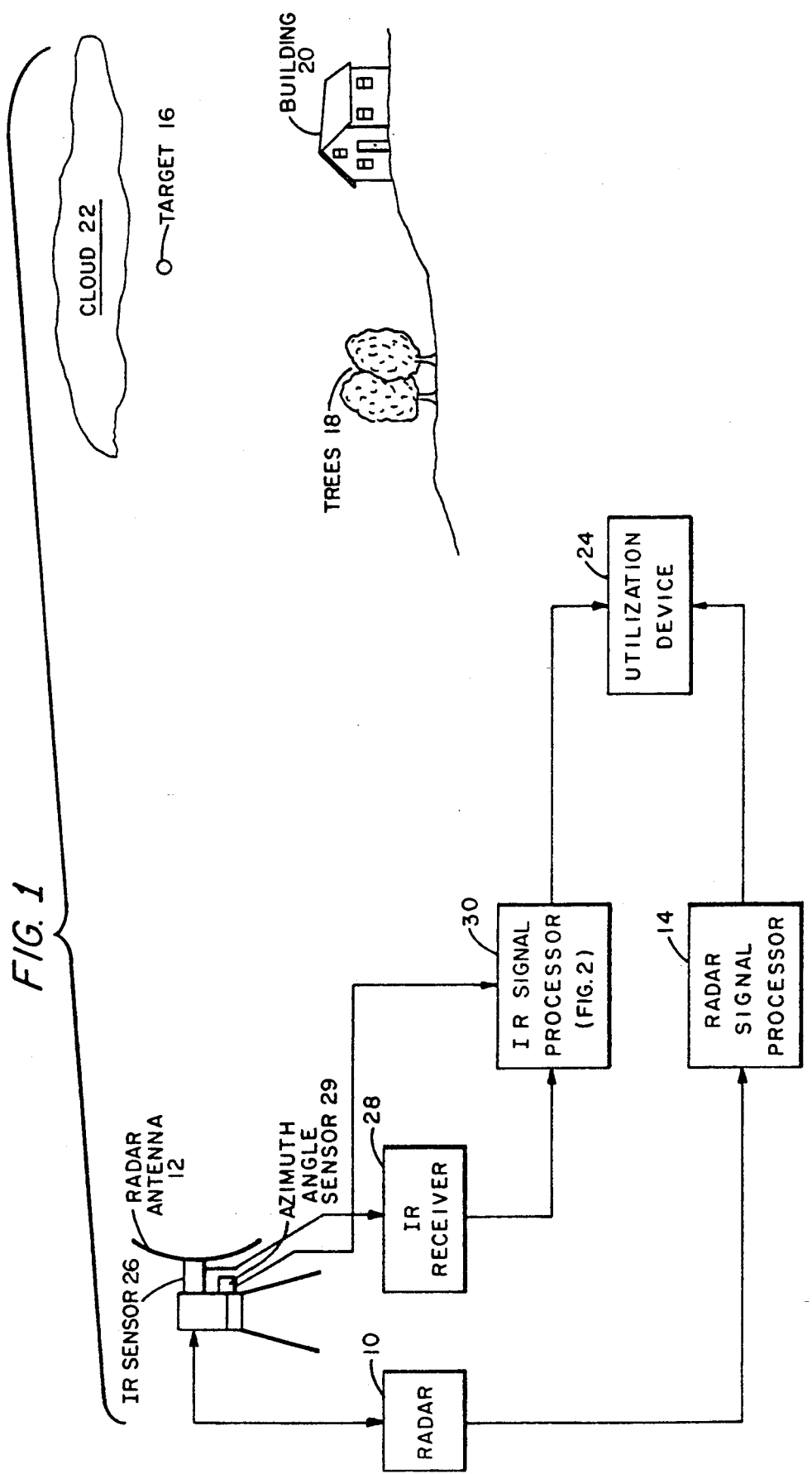
FIG. 1 is a simplified block diagram of a dual mode tracking system operated in accordance with this invention.

Before referring to the drawings in detail it should be noted that, because the contemplated invention here resides in the way in which IR signals are to be processed in a dual mode tracking system, only the elements of an illustrative dual mode tracker required to understand the contemplated method are shown in any detail. It is felt that a person of ordinary skill in the art will, however, immediately observe that any one of a great many known radars and IR detection arrangements may be operated following the method to be described.

With the foregoing in mind it may be seen in FIG. 1 that a dual mode tracking system (not numbered) may include a radar 10, an associated scanning radar antenna 12 and a radar signal processor 14. It will be observed that a target 16 (here assumed to be an incoming aircraft) at a relatively low altitude may, or may not, be detected by the radar 10. That is to say, destructive interference between echo signals directly from the target 10 and echo signals reflected from the ground between the radar antenna 12 and the target 16 may, or may not, prevent detection of the target 16 by the radar 10. Similarly, clutter signals (as from trees 18 and the building 20) may, or may not, be detected by the radar 10. It will be noted that the interference pattern experienced by the radar 10 will change as the range of the target 16 decreases until finally constructive interference occurs and the target 16 is detected. However, the range at which detection occurs may be so short that the target 16 may penetrate the protective screen (not shown) around the radar before effective defensive measures may be taken. An IR detection arrangement to be described is used along with the radar 10 to fill in the coverage so that the target 16 may be detected at longer ranges.

It will be noted that the interference pattern between IR energy returned directly from the target 16, the trees 18, the building 20 and the cloud 22 and IR energy from such objects reflected off the ground is markedly different from the corresponding interference pattern of the radar echo signals. For all practical purposes, the IR interference pattern has peaks and nulls so closely spaced that the target never becomes invisible so long as the range to the target 16 is not in excess of the maximum range of detection.

The IR detection arrangement here consists of an IR sensor 26, an IR receiver 28 and an IR signal processor 30. The IR sensor 26 is, for example, a substantially vertically oriented linear array of photovoltaic cells (not shown) continuously rotated in synchronism with the radar antenna 12. An azimuth angle sensor 29 is mounted to produce signals indicative of the position in azimuth of the linear array of photovoltaic cells. It will be evident that the photovoltaic cells may be mounted so that the field of view of each photovoltaic cell cuts a swath at a different elevation angle.

Before proceeding with a detailed description of the contemplated IR signal processor 30, it should be noted that that processor uses detection algorithms based upon discernable differences in the characteristics of the IR clutter and IR signals. Thus, the main characteristics of the IR signal from any target of interest here are: (a) a small spatial extent; (b) a rapid rise and fall; and (c) a systematic motion. On the other hand, IR ground clutter or IR clutter from the body of a cloud has a relatively wide spatial extent; IR clutter from the edge of a wind-driven cloud has a relatively slow rise and fall; and IR clutter from a scintillating object usually appears to have little, if any, motion.

Figure 2:
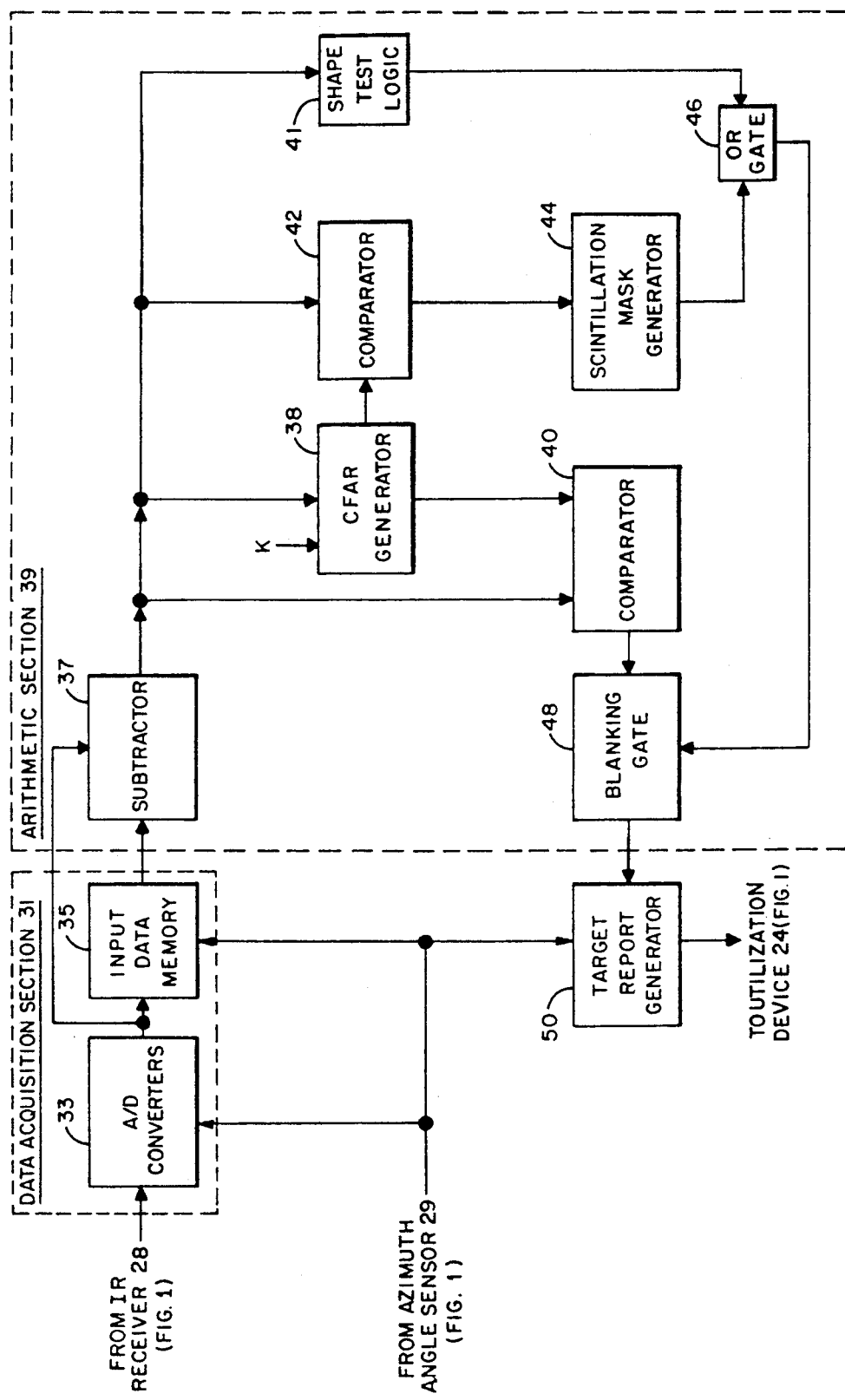
FIG. 2 is a functional block diagram of the IR signal processor shown in FIG. 1.

Referring now to FIG. 2, it will be observed that digital signals from the IR receiver 28 (FIG. 1) are passed through a data acquisition section 31, here consisting of analog-to-digital converters (A/D converters 33) and an input data memory 35. The A/D converters 33 here are conventional, being strobed by signals from the azimuth angle sensor 29 (FIG. 1), to convert the analog signals out of the IR receiver 28 (FIG. 1) to digital signals for storage in the input data memory 35. It will now be apparent to one of skill in the art that the just described data acquisition section 31 may be arranged to store data for exactly one azimuthal scan (meaning rotation in azimuth of 360°) of the IR sensor 26 (FIG. 1). It follows then that the inputs to a subtractor 37 in an arithmetic section 39 are indicative of the IR energy received from the same points in space on successive azimuthal scans. With the connections shown, it will be evident that the subtractor 37 is effective to produce: (1) a logic zero level signal when IR energy...is received during both azimuthal scans or during neither azimuthal scan; or, (2) a signal having a level above the logic zero level when IR energy is received during one or the other azimuthal scans. It will be observed that IR signals from sources having a large spatial extent will almost always cause a logic zero level to be produced because IR energy is almost always present on two successive azimuthal scans from such clutter. To put it another way, almost all extended ground clutter and clutter from the body of any cloud will be cancelled in the subtractor 37.

A CFAR generator 38 here is operative to produce a first threshold signal at a level that varies in accordance with the average level of the signals in different subgroups out of the subtractor 37. In terms of the art, the CFAR generator 38 operates to average the signals from photovoltaic cells in a sliding window centered on, but not including, a photovoltaic cell of interest (and two immediately adjacent cells). To obtain the desired threshold signal, the average of the signals in each window, i.e., the noise level in each window, is multiplied by a constant K finally to produce a first threshold signal at a level somewhat above the noise level so that a desired CFAR is attained. The constant K just referred to may be selected by an operator who would vary the level of the constant K in accordance with the noise level, or may simply be set to a predetermined level. The first threshold signal is applied to a comparator 40 wherein each signal out of the subtractor 37 is compared to the first threshold signal. A "non zero" signal out of the comparator 40 then is indicative of a signal out of the subtractor 37 that has a level exceeding the first threshold level.

The shape test logic 41 here is arranged to process a subset of seven successive signals out of the subtractor 37 to determine how the amplitudes of those signals vary. The magnitudes of such signals may be defined as $(V)$, $(V_{+1})$, $(V_{+2})$, $(V_{+3})$, $(V_{-1})$, $(V_{-2})$ and $(V_{-3})$ where V is the central one of the subset and the numerical subscript indicates the position of each signal in the subset. The shape test logic 41 is first operative to produce an index number A in accordance with the following:

$$A = [(V_{+3} - V_{+1})/(V_{+2})] - [(V_{-1} - V_{-3})/(V_{-2})] \qquad \text{Eq. (1)}$$

The index number A is then compared to (V) in a digital comparator (not shown) to produce a logic one level signal only when $|A| \geq (V)$, or $|A|/(V) \geq 1$.

Figure 3:
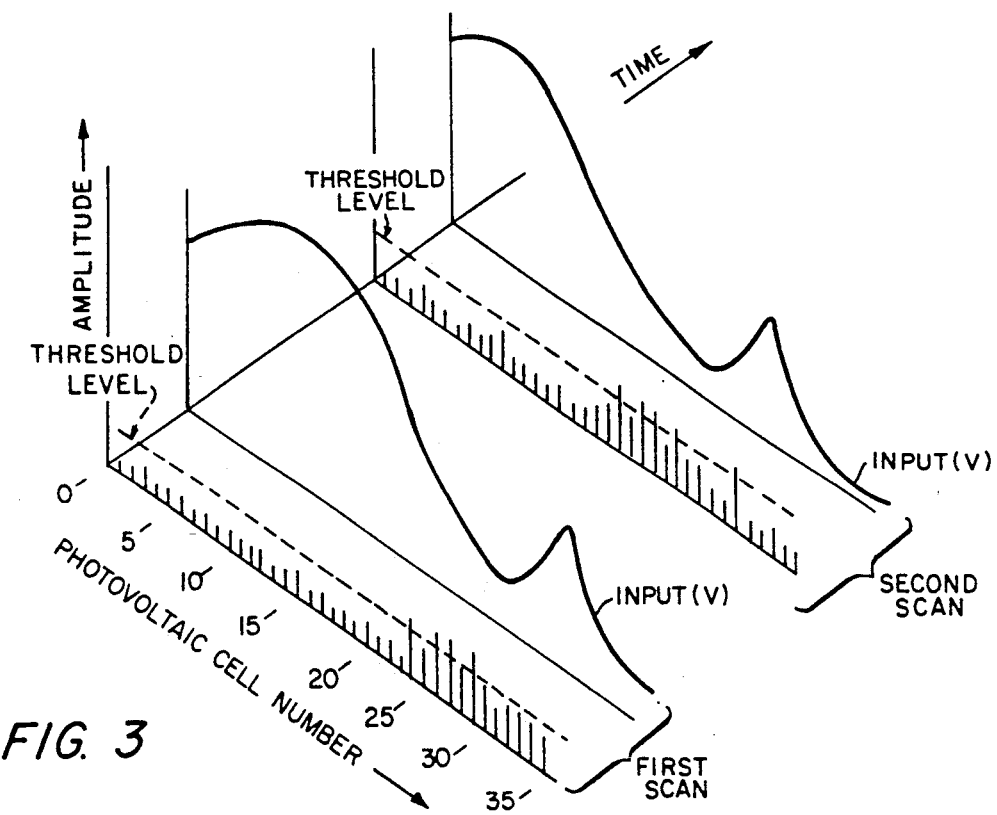
FIG. 3 is a sketch useful in understanding the contemplated "slope test" processing technique for producing a blanking pulse from IR clutter attributable to the edges of wind-driven clouds against a blue sky background.

An exemplary input and output of the shape test logic 41 is shown in FIG. 3. Thus, the amplitude of the IR energy in thirty-six successive signals during two successive azimuthal scans of the photovoltaic cells in the IR sensor 26 (FIG. 1) is shown by the lines labeled "Input (V)". In the first azimuthal scan IR energy from a wind-driven cloud 22 (FIG. 1) appears in photovoltaic cells numbered 0-23 and IR energy from a target in photovoltaic cells numbered 26-34. In the second azimuthal scan, IR energy from a wind-driven cloud appears in photovoltaic cells numbered 0-15 and IR energy from a target appears in photovoltaic cells numbered 21-29. It will be noted here in passing that, because there is movement between azimuthal scans, the subtractor 37 (FIG. 2) would not be effective to completely cancel the cloud clutter. That is to say, the output of the CFAR generator 38 (FIG. 2) would falsely be at a logic one level. Returning now to the explanation of the shape test logic 41, the histogram shown for each one of the two illustrated scans represents the output of the shape test logic 41. It will be noted that that output is almost always lower than a selected threshold level whenever IR energy from a cloud is received, but is above the threshold level whenever IR energy from a target is received. Inversion of the signals then produces the final output of the shape test logic 41.

Figure 4:
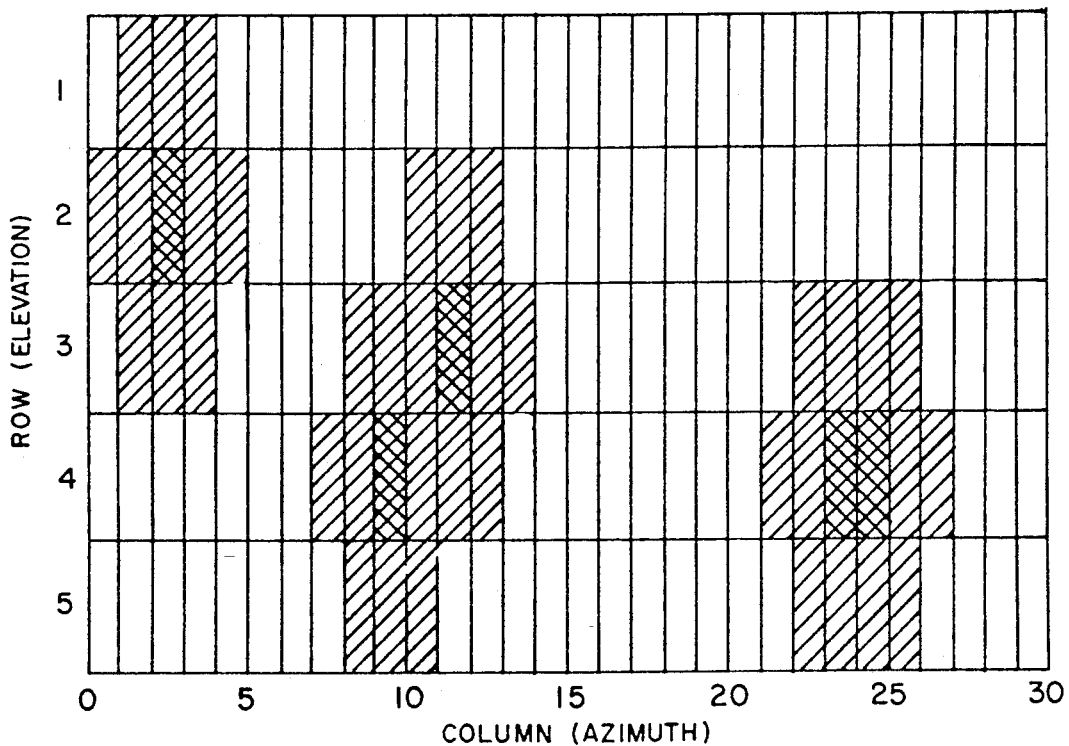
FIG. 4 is a sketch useful in understanding the contemplated "scintillation mask" test for producing a blanking pulse from IR clutter attributable to scintillating objects.

A scintillation test is used to inhibit IR returns from, for example, sunlight reflected from glass windows in the building 20 (FIG. 1) or from leaves in the trees 18 when stirred by wind. The scintillation test here is responsive to each signal out of the subtractor 37 that exceeds a second threshold level to inhibit the corresponding signal on the next following azimuthal scan along with signals from adjacent points in the field of view. For example, as shown in FIG. 4, the output signal from column 3, row 2 may be blocked along with the output signals from the shaded addresses surrounding that address in FIG. 4. When IR signals appear at closely spaced addresses (as in the center of FIG. 4), or in adjacent addresses (as on the right of FIG. 4), the outputs of different areas are blocked. However, it will be clear to one of skill in the art that operation in such cases is the same as for the simple case of a single IR signal just described.

To carry out the scintillation test, a second threshold signal is applied to a comparator 42 along with the signals out of the subtractor 37. Any signal from the latter that exceeds the second threshold causes a scintillation mask generator 44 to produce an inhibiting signal during the next following scan for the output of the corresponding photovoltaic cell and the selected adjacent photovoltaic cells.

The outputs of the shape test logic 40 and the scintillation mask generator 44 are passed, via an OR gate 46, to a blanking gate 48 along with the signals out of the comparator 42. It will be evident, then, that the output of the blanking gate 48 represents "potential" target signals that have passed both the scintillation and shape tests. Such signals may safely be taken to be signals from valid targets. The output of the blanking gate 48 is passed to a target report generator 50 wherein correlation of each signal in such output to a photovoltaic cell is effected.

Having described an embodiment of this invention, it will be obvious to one of skill in the art that changes may be made without departing from our inventive concepts. For example, the photovoltaic cells could be arranged in a two dimensional array so that a mechanical scan would not be necessary or the IR elements could be used independently of a radar. It is felt, therefore, that this invention should not be restricted to its disclosed embodiment, but rather should be limited only by the spirit and scope of the appended claims.

What is claimed is:

1. The method of processing signals in a detection system including a passive infrared sensor made up of a linear array of photovoltaic detectors that is rotated in azimuth and systematically interrogated to produce successive trains of signals, the signals in each one of the trains being correlated with a specific one of the photovoltaic detectors, such method comprising the steps of:
   (a) storing, at a predetermined address in a storage medium, each one of the signals in a first train thereof to produce a record of the IR energy received by each one of the photovoltaic detectors from IR sources on a predetermined bearing;
   (b) at a later time when the photovoltaic detectors are receiving IR energy from the IR sources on the predetermined bearing, sequentially interrogating such detectors to produce a second train of signals;
   (c) subtracting each signal in the second train thereof from the corresponding stored signal in the first train to produce a third train of signals wherein the amplitude of each signal is indicative of a change in the IR energy received at different times by each photovoltaic detector from IR sources on the predetermined bearing;
   (d) multiplying each one of the signals in the third train by a first selected factor to produce a fourth train of signals wherein the amplitude of each signal in the fourth train is an amplified version of the corresponding signal in the third train;
   (e) comparing each signal in the fourth train with a first reference signal having a first selected amplitude to produce a fifth train of signals wherein each signal in the fifth train is at a logic one level only when the amplitude of the corresponding signal in the fourth train is greater than the selected amplitude of the first reference signal;
   (f) comparing each signal in the fifth train with the corresponding signal in the third train to produce a potential target signal having a logic one level only when the amplitudes of the corresponding pairs of signals in the third and fifth trains are equal;
   (g) selecting a subset of the third train of signals, such subset being made up of a signal designated by "V" at a selected address and signals at the three immediately preceding addresses designated by "V"$_{+1}$, "V"$_{-2}$, "V"$_{-3}$ and signals at the three immediately following addresses designated by "V"$_{+1}$, "V"$_{+2}$, "V"$_{+3}$;
   (h) determining an index number "A" in accordance with the equation $$A = (V_{+3} - V_{+1})/V_{+2} - (V_{-1} - V_{-3})V_{-2};\text{ and}$$

(i) comparing the amplitude $|A|$ of the index number A with the signal V to produce a first inhibiting signal only when $|A| \geq V$.

2. The method as in claim 1 with the additional steps of:
   (a) rotating the array of photovoltaic detectors to sweep such detectors in azimuth so that each successive interrogation of such detectors produces a train of response signals similar to the first train of response signals but representative of the IR energy from IR sources on a different bearing;
   (b) storing all such trains of response signals to produce a record of the IR energy received by each photovoltaic detector from IR sources on different bearings;
   (c) comparing each signal in the third train with a second reference signal having a second selected amplitude to produce a sixth train of signals wherein each signal has a logic one level only when the amplitude of the corresponding signal in the third train exceeds the level of the second reference signal; and
   (d) producing, in response to each one of the signals in the sixth train having a logic one level, a second inhibiting signal operative on the corresponding signal and signals from adjacent bearings during the next scan.

3. The method as in claim 5 with the additional steps of:
   (a) applying each potential target signal to a blanking gate as an input to such gate; and
   (b) applying the first and the second inhibiting signal to the blanking gate to prevent any potential target signal extant when either blanking signal is present from passing through the blanking gate, thereby to produce target signals at the output of the blanking gate.

* * * * *